(12) United States Patent
Nordfors et al.

(10) Patent No.: US 9,517,425 B2
(45) Date of Patent: Dec. 13, 2016

(54) FILTER ELEMENT, METHOD FOR MANUFACTURING AND USE THEREOF

(71) Applicant: Valmet Technologies Oy, Espoo (FI)

(72) Inventors: Rauno Nordfors, Tampere (FI); Marko Salmela, Perth (AU); Sanna Uusitalo, Ruutana (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 14/787,177

(22) PCT Filed: May 9, 2014

(86) PCT No.: PCT/FI2014/050349
§ 371 (c)(1),
(2) Date: Oct. 26, 2015

(87) PCT Pub. No.: WO2014/184433
PCT Pub. Date: Nov. 20, 2014

(65) Prior Publication Data
US 2016/0107108 A1    Apr. 21, 2016

(30) Foreign Application Priority Data

May 13, 2013    (FI) ..................................... 20135500

(51) Int. Cl.
*B01D 25/00*    (2006.01)
*B01D 29/05*    (2006.01)
(Continued)

(52) U.S. Cl.
CPC .............. *B01D 29/41* (2013.01); *B01D 25/00* (2013.01); *B01D 25/001* (2013.01); *B01D 29/90* (2013.01);
(Continued)

(58) Field of Classification Search
CPC ....... B01D 25/00; B01D 25/001; B01D 25/04; B01D 25/16; B01D 29/05; B01D 29/13; B01D 29/39; B01D 29/395; B01D 29/41; B01D 29/413; B01D 29/44; B01D 29/46; B01D 29/52; B01D 33/21; B01D 33/23; B01D 33/0093; B01D 39/08; B01D 39/083; B01D 2201/04; B01D 2201/0415; B01D 2201/0423; B01D 2201/60; B01D 29/88; B01D 29/90; B01D 29/902
(Continued)

(56) References Cited

U.S. PATENT DOCUMENTS 772,132 A    10/1904    Crossley
2,793,754 A *  5/1957    Yeiser .................... B01D 29/05
                                                    210/328
(Continued)

FOREIGN PATENT DOCUMENTS

CN    2062250 U    9/1990
CN    1358556 A    7/2002
(Continued)

OTHER PUBLICATIONS

International Searching Authority, International Search Report and Written Opinion for International Application No. PCT/FI2014/050349, Aug. 14, 2014, 9 pages, National Board of Patents and Registration of Finland, Finland.
(Continued)

*Primary Examiner* — Joseph Drodge
(74) *Attorney, Agent, or Firm* — Alston & Bird LLP (57) ABSTRACT

The invention relates to a filter element, a method for manufacturing the filter element, and use. The filter element (1) is formed of a solid-liquid filter fabric (2) and has at least
(Continued)

one separately manufactured support element (14) fastened to it. The support is a plate-like piece.

17 Claims, 4 Drawing Sheets

(51) Int. Cl.
*B01D 29/39* (2006.01)
*B01D 39/08* (2006.01)
*B01D 29/90* (2006.01)
*B01D 29/41* (2006.01)
*B01D 33/23* (2006.01)

(52) U.S. Cl.
CPC .............. *B01D 33/23* (2013.01); *B01D 39/083* (2013.01); *B01D 2201/0415* (2013.01)

(58) Field of Classification Search
USPC ..... 29/428, 896.62; 210/331, 346, 347, 483, 210/486, 499, 767, 456
See application file for complete search history.

(56) References Cited

U.S. PATENT DOCUMENTS

| | | | | |
|---|---|---|---|---|
| 3,331,512 | A * | 7/1967 | Vore | B01D 33/23 210/487 |
| 4,159,951 | A | 7/1979 | Davis | |
| 4,284,507 | A * | 8/1981 | Beane | B01D 39/083 112/10 |
| 2009/0026152 | A1* | 1/2009 | Collins | B01D 33/21 210/791 |
| 2009/0272685 | A1* | 11/2009 | Steinhardt | B01D 29/035 210/350 |

FOREIGN PATENT DOCUMENTS

| | | |
|---|---|---|
| CN | 2503966 Y | 8/2002 |
| CN | 201949698 U | 8/2011 |
| CN | 101890256 B | 12/2011 |
| CN | 102961906 A | 3/2013 |
| EP | 2682171 A1 | 1/2014 |
| GB | 709077 A | 5/1954 |
| GB | 945065 A | 12/1963 |
| JP | H10-249107 A | 9/1998 |
| JP | 3470006 B2 | 11/2003 |
| JP | 2008-132428 A | 6/2008 |
| KR | 10-0848860 B1 | 7/2008 |
| KR | 2012-0108131 A | 10/2012 |
| WO | WO 2012/116612 A1 | 9/2012 |

OTHER PUBLICATIONS

International Preliminary Examining Authority, Second Written Opinion for International Application No. PCT/FI2014/050349, May 6, 2015, 7 pages, National Board of Patents and Registration of Finland, Finland.

International Preliminary Examining Authority, International Preliminary Report on Patentability for International Application No. PCT/FI2014/050349, including Applicant's Aug. 14, 2015 to IPEA's third (Jun. 30, 2015) Written Opinion, Aug. 31, 2015, 9 pages, National Board of Patents and Registration of Finland, Finland.

National Board of Patents and Registration of Finland, Office Action for Application No. 20135500, Feb. 7, 2014, 5 pages, Finland.

National Board of Patents and Registration of Finland, Search Report for Application No. 20135500, Feb. 7, 2014, 2 pages, Finland.

National Board of Patents and Registration of Finland, Office Action for Application No. 20135500, Sep. 8, 2015, 4 pages, Finland.

State Intellectual Property Office of the P.R.C., First Office Action for Application No. 201480026455.9, Aug. 1, 2016, 17 pages, China.

* cited by examiner

FIG. 7 ary. Pressure isand form a weave
FILTER ELEMENT, METHOD FOR MANUFACTURING AND USE THEREOF

CROSS REFERENCE TO RELATED APPLICATIONS

This application is a National Stage Application, filed under 35 U.S.C. 371, of International Application No. PCT/FI2014/050349, filed May 9, 2014, which claims priority to Finnish Patent Application No. 20135500, filed May 13, 2013, the contents of both of which as are hereby incorporated by reference in their entirety.

BACKGROUND

Related Field

Description of Related Art

The invention relates to a filter element meant for solid-liquid filtering in a filtering device provided with a filter element that allows solids and liquid to be separated from slurry.

The invention further relates to a method for manufacturing a filter element and to a use of the filter element.

The field of the invention is described in more detail in the preambles of the independent claims of the application.

Solid-liquid filtering is used for separating liquid and solid particles from a mixture with a filter. Solid-liquid filtering is used e.g. in refining of minerals, paper manufacturing and in processing different waste slurries. Pressure is usually used to assist the filtering. The filtering device is provided with a filter element made of a solid-liquid filter fabric. Solid particles in the slurry to be filtered do not penetrate the filter fabric but remain on its filter surface and form a solids cake. Current filter elements have shown to contain some disadvantages that shorten their service life, for example.

BRIEF SUMMARY

An object of the present invention is to provide a novel and improved filter element, a method for manufacturing the filter element, and its use.

The filter element of the invention is characterised in that the support element is a plate-like piece differing from the fabric structure; and the support element is permanently fastened to the filter element.

The method of the invention is characterised by forming a support element of a plate material differing from the fabric structure; and by fastening the support element to the filter element in advance, before the filter element is mounted to the filtering device.

The use of the invention is characterised by using the filter element of claim 1 in a vertical chamber press.

According to the disclosed solution, a filter element formed of a solid-liquid filter fabric is provided with one or more plate-like support elements permanently fastened to it. In addition, the support element differs from the fabric structure.

An advantage of the disclosed solution is that the plate-like support element is durable and sustains loads well. The plate-like support element is particularly well capable of receiving tension loads in the direction of the planes of its side surfaces. A further advantage of the plate-like support element is that it is easy to manufacture and to attach in place to a desired location in the filter element. Moreover, with the support element permanently fastened to the filter element, before the filter element is mounted to the filtering device, the filter element is quick and easy to install.

According to an embodiment, the support element is on a filtering portion of the filter element. The actual filtering takes place on the filtering portion through the filter element.

According to an embodiment, the plate-like support element is of a uniform impermeable material.

According to an embodiment, the plate-like support element has planar and smooth side surfaces.

According to an embodiment, the solid-liquid fabric of the filter element is a woven fabric with crossing machine-direction and cross-direction threads that form a weave pattern. The filter fabric has a filter surface and an opposite back surface.

According to an embodiment, the filter element has a flow opening that penetrates the solid-liquid filter fabric. The flow opening may be a feed opening through which slurry to be filtered may be supplied into a space defined by the filter element.

According to an embodiment, the filter element has a flow opening located on the upper part of the filter element, i.e. on a portion between the top edge and the middle of the element. The flow opening is typically located on a top quarter portion of the filter element and on the centre line of the filter element in side direction.

According to an embodiment, the support element comprises at least one flow opening. The flow opening is arranged to coincide with the flow opening in the solid-liquid fabric of the filter element. The support element may be arranged only on one side of the solid-liquid filter fabric or, alternatively, support elements may be provided on both sides of the solid-liquid filter fabric, the fabric thus being between the support elements.

According to an embodiment, the support element comprises only one flow opening. The flow opening may be located in the middle of the support element.

According to an embodiment, the support element comprises at least one flow opening that surrounds the supply opening of the filter element. A feed shoe or a similar feed member may be connected to the supply opening to allow slurry that is to be filtered to be supplied into the filter chamber defined by the filter element. The support element supports and reinforces the supply opening in the filter element, which enables to ensure that the feed member is tight and stays in place. Use of the disclosed support element extends the service life of the filter element and thus improves productivity.

According to an embodiment, the support element comprises at least one flow opening that surrounds a discharge opening provided in the filter element.

According to an embodiment, the support element comprises one or more positioning members. The positioning member may be a slot provided on the periphery of the flow opening and connected thereto. Alternatively, the positioning member may be an opening formed at a distance from the edge of the flow opening. The number of the disclosed positioning members may be four, for example, and they may be located at regular intervals around the flow opening. A pin or some other protrusion of the feed shoe or a similar feed member may set into the positioning opening or slot so that the position of the feed member in relation to the filter element remains unchanged. In practice the positioning members may thus prevent the feed shoe from turning relative to the flow opening.

According to an embodiment, the support element has a shape of a plate-like annular piece comprising an inner diameter and an outer diameter. The inner diameter defines the flow opening that may be connected to the feed shoe, or a similar feed member, of the filtering device. Also the outer diameter of the support element may be dimensioned in accordance with the feed shoe of the filtering device so that a tight coupling is achieved between the filter element and the feed member. The disclosed annular plate structure provides good stiffening around the flow opening.

According to an embodiment, the shape of the support element may be a plate-like rectangle, i.e. an oblong or a square. In addition, the support element may comprise one or more flow openings.

According to an embodiment, the support element has a thickness of 1 to 2 mm. In that case the support element is sufficiently rigid, yet flexible. The support element receives well tensile loads in the direction of its plane, yet the support element is capable of shaping during use in a direction transverse to its plane. In that case the shape of opening, for example, in the support element remains substantially unchanged.

According to an embodiment, the width of the support element is from 25 to 60 mm, preferably from 30 to 50 mm.

According to an embodiment, the support element is cut from a bigger plate blank.

According to an embodiment, the support element is made of a polymer plate. A polymer plate is relatively easy to work into a desired support element e.g. by water jet cutting, laser cutting or die cutting. In addition, a polymer plate is inexpensive and typically sustains well different conditions and loads. Moreover, there are numerous alternative solutions for fastening a polymer plate to the surface of the filter element.

According to an embodiment, the support element is of the same material as the solid-liquid filter fabric of the filter element. This facilitates the fastening of the support element and allows, for example, some welding techniques to be used. The solid-liquid filter fabric may be made by weaving synthetic polymer threads and, accordingly, the support element may be a polymer plate.

According to an embodiment, the support element is of polypropylene PP. Also the solid-liquid filter fabric may be made of threads that are polypropylene. Common advantages of polypropylene worth mentioning include good chemical resistance, lightness, good weldability and an affordable price.

According to an embodiment, the support element is of polyurethane PU.

According to an embodiment, the support element is a mixture of two or more polymers.

According to an embodiment, the support material is of rubber or a rubber mixture.

According to an embodiment, the support element is of reinforced plastic containing one or more matrix plastics and one or more fibre reinforcements.

According to an embodiment, the support element is a moulded piece with a plate-like shape.

According to an embodiment, the support element is of fibre plate, such as thin veneer.

According to an embodiment, the solid-liquid filter fabric and the support element comprise side surfaces that are placed against one another and fastened together. The fastening of a side surface of the support element to a side surface of the filter element is quick, and there are a number of different alternatives for it. In addition, the support element may be of a simple shape and structure, and thus its manufacturing costs may be low.

According to an embodiment, the support element is fastened to the side surface of the solid-liquid filter fabric without a fastening that penetrates the support element or without separate mechanical fastening members. In that case the fastening is only between the surfaces of the support element and those of the filter fabric that are against one another.

According to an embodiment, the support element is fastened to the solid-liquid filter fabric by welding. Thermoplastics may be fastened together by heat and pressure. Filler material may be used in the welding, or it may be carried out without filler material. The surfaces of the pieces to be fastened are heated so that they soften. The softened plastic surfaces are then pressed against each other.

According to an embodiment, the support element is fastened to the solid-liquid filter fabric by ultrasonic welding. In that case the fastening surfaces of the solid-liquid fabric and the support element are heated by means of ultrasonic energy. When the fastening surfaces have softened, they are pressed together. An advantage of ultrasonic welding is its rapidity and the good strength of the fastening obtained.

According to an embodiment, the support element is fastened to the solid-liquid filter fabric by a number of spot welded seams. At least one of the advantages of spot welding is that the welding equipment is affordable and serves diverse purposes. Often spot welding allows also a sufficiently strong joint to be achieved.

According to an embodiment, the support element is attached to the solid-liquid filter fabric by a continuous welded seam. The welding device may comprise welding blocks between which the solid-liquid filter fabric and the support element may be arranged and where they may be pressed during the welding. An advantage of this arrangement is the speed and good quality of the welding.

According to an embodiment, the support element is fastened to the solid-liquid filter fabric by laser welding. In laser welding, the energy needed for heating the fastening surface of the solid-liquid filter fabric and that of the support element is brought to the fastening area by a laser beam. Advantages of laser welding worth mentioning are its accuracy and speed.

According to an embodiment, the support element is fastened to the solid-liquid filter fabric by an adhesive.

According to an embodiment, the support element is fastened to the solid-liquid filter fabric by stitches.

According to an embodiment, the support element is fastened by applying two or more of the above-mentioned fastening arrangements.

According to an embodiment, the support element is fastened by applying form locking. The fastening may be based on form locking alone, or, alternatively, one of the above presented fastening means, such as welding, gluing or stitching, is applied in addition to form locking.

According to an embodiment, the outer edges of the support element are provided with fastening grooves for the form locking. The filter fabric of the filter element has an opening formed therein and the support element is arranged into the opening so that the edges of the opening are in the fastening grooves. The support element may be formed of a sufficiently elastic material that allows it to be installed in place into the opening, or, alternatively, the support element may be formed of two halves between which the edges of the opening in the filter element set.

According to an embodiment, the filter element is an element of a chamber press. The filter element is arranged between filter plates restricting the filter chamber, and the slurry to be filtered is pressed at high pressure through the filter element, whereby solid matter particles that do not penetrate the filter element form a solids cake onto the filter surface of the filter element.

According to an embodiment, the filter element is an element in a vertical chamber press.

According to an embodiment, the filter element is an element in a vertical chamber press, the element being a planar piece and comprising horizontal upper and lower edges and vertical side edges. The filter element may be provided with mounting members with which it may be suspended from or in another manner supported to the chamber filter. The top edge of the filter element is provided with a channel formed of fabric for fitting a suspension rod or the like therein for vertically suspending the filter element. The bottom edge of the filter element may be provided with weights that make the filter element hang vertically. The weights may be arranged into a fabric channel at the bottom edge.

According to an embodiment, the filter element is a filter bag, such as a bag to be arranged onto a disc filter sector. The filter bag may have a substantially triangular shape. The support element may be arranged against the surface of the filter bag. The support element enables the filter fabric to be supported at desired locations.

In this application the term "plate-like piece" is used for a substantially planar piece having opposite plane surfaces and differing from a fabric structure and a mesh, for example. The plate-like piece may be formed of a plate blank, which may be a solid plate. The formed support element may be impermeable or, in some cases, the plate structure of the basic material may be provided with a plurality of small openings that make its basic structure permeable. Moreover, the support element may be provided with a projecting edge, yet the piece is still substantially plate-like. An edge reinforcement such as this may be on an edge of the flow opening provided in the support element, for example.

It should be noted that the above embodiments and their features may be combined in various ways. Different combinations may thus be formed as necessary.

BRIEF DESCRIPTION OF THE FIGURES

Some embodiments are explained in more detail in the accompanying drawings, in which.

For the sake of clarity, the figures show some embodiments in a simplified manner. In the figures, like reference numerals identify like elements.

DETAILED DESCRIPTION OF VARIOUS EMBODIMENTS

Figure 1:
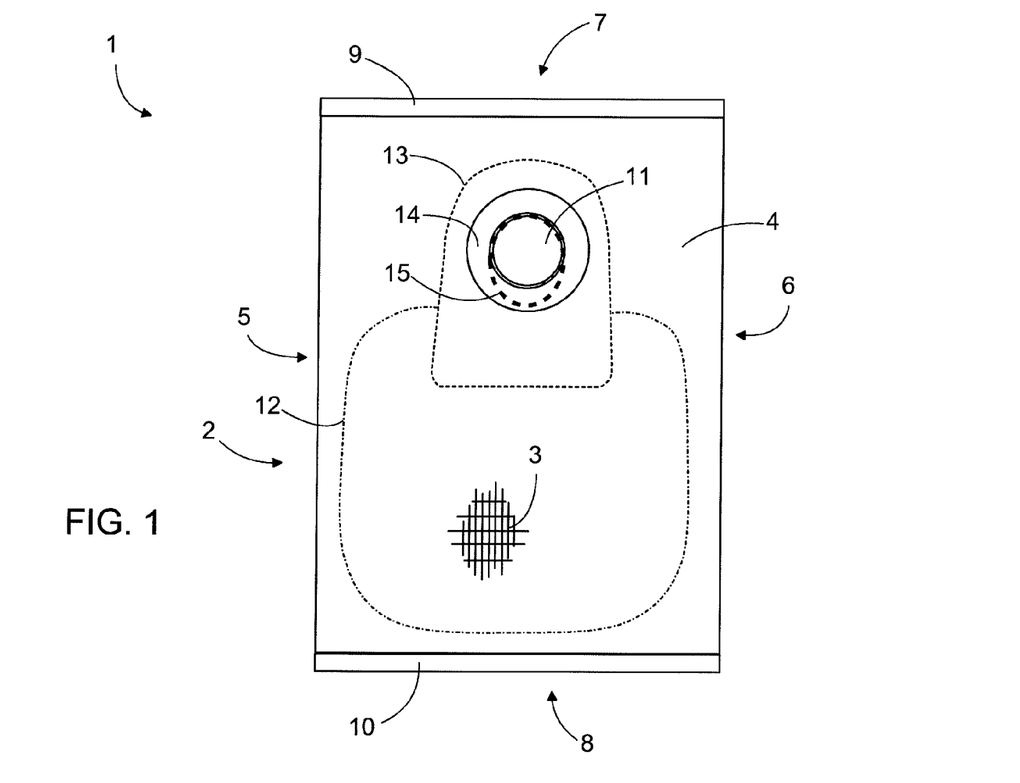
FIG. 1 is a schematic side view of a filter element.

FIG. 1 shows a filter element 1 made of a solid-liquid filter fabric 2. In this case, the filter element 1 is meant for a vertical chamber filter. The solid-liquid filter fabric 2 may be of a woven fabric 3 with crossing machine-direction and cross-direction threads. In a side view, the filter element 1 has a substantially rectangular shape. The filter element 1 has planar side surfaces 4 on both sides thereof, vertical edges 5 and 6 and a horizontal top edge 7 and bottom edge 8. The top edge 7 may be provided with a channel 9, or another suspension member, for enabling the filter element 1 to be supported between filter plates of a chamber filter. The channel 9 may be formed of the filter fabric 2 or it may be a separate fabric channel fastened to the top edge 7. A support rod, or the like, may be inserted into the channel 9. The bottom edge 8 may be provided with a similar channel 10 for weights to be inserted therein. The filter element 1 may hang freely in a vertical direction with the weights pulling the bottom edge 8 downward and the top edge 7 being supported to the filtering device. In addition, the side surface 4 of the filter element is provided with one or more feed openings 11 for feeding the mixture to be filtered. The side may also be provided with one or more discharge openings for discharging the filtered liquid. The filter chamber is illustrated in the figure by a line of dots and dashes 12 and a feed shoe 13, or a similar feed member, is depicted by a broken line in connection with the feed opening 11. Around the feed opening 11, there is arranged an annular plate-like support element 14 that supports the feed opening 11 and prevents its deformation. The figure illustrates a typical deformation 15, depicted by a broken line, that occurs if the feed opening is not supported well enough. The structure of the solid-liquid filter fabric yields relatively easily. The feed opening 13 is now provided with a plate-like support element 14 arranged around it and providing an essentially better stiffness against deformations of this kind.

It should be noted that the structure, shape, dimensions, mounting and suspension means of the filter element 1 and the locations, number and dimensions of the openings are naturally selected to suit each particular filtering device. Hence the principles disclosed in this application may be applied also in connection with filter elements of other types than the filter element 1 of FIG. 1.

Figures 2A, 2B:
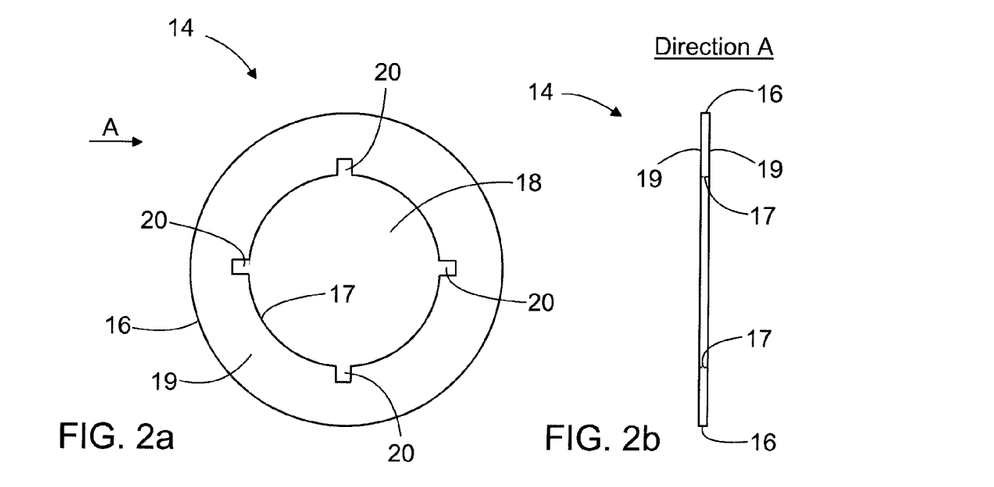
FIG. 2*a* is a schematic side view of an annular support element.
FIG. 2*b* shows the same support element from direction A.

FIG. 2*a* shows an annular support element 14 with an outer circumference and an outer diameter 16 and an inner circumference and inner diameter 17. The support element 14 in question is provided with a flow opening 18. In addition, the support element has side surfaces 19 that may be arranged against the side surface of the filter element and then fastened permanently in place by welding or gluing, for example. The support element may also be provided with positioning members 20 to which counter members provided in the feed member may be connected. The positioning members 20 may be slots formed on the inner circumference 17. For example four positioning members 20 may be provided, and they may be evenly distributed around the flow opening 18. FIG. 2*b* shows the plate-like shape of the support element 14 from direction A.

Figures 3A, 3B:
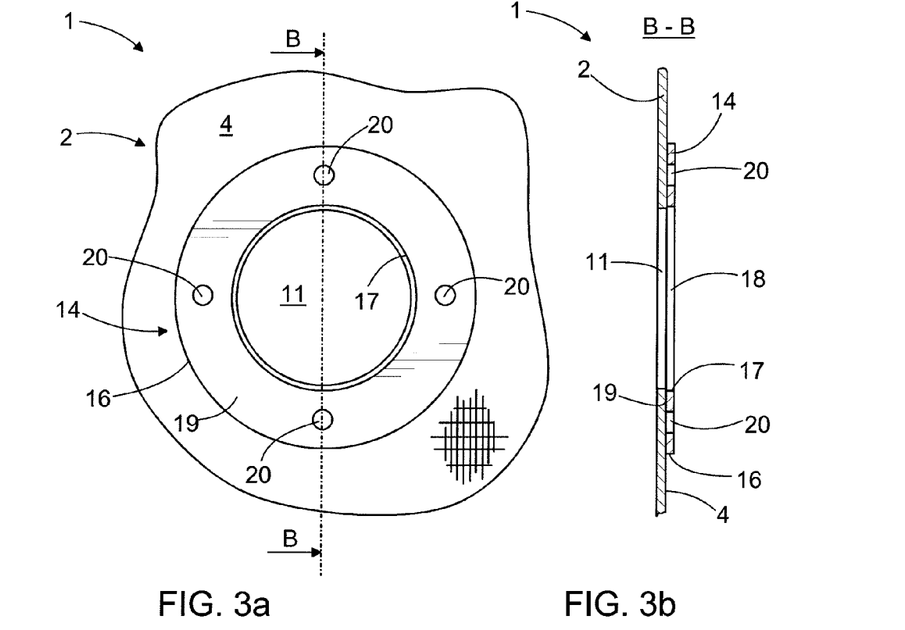
FIG. 3*a* is a schematic side view of a second support element.
FIG. 3*b* shows a cross-section of the support element at B-B.

FIG. 3*a* shows a second support element 14 attached to the side surface 4 of the filter member 1. The flow opening of the support element 14 is arranged to coincide with the flow opening 11 in the solid-liquid filter fabric 2. The support element 14 is similar to the one in FIG. 2a, except for the different positioning members 20. In that case openings, instead of slots, are provided on the portion between the outer diameter 16 and the inner diameter 17. FIG. 3b shows that the side surface 19 of the support element 14 is arranged against the side surface 4 of the filter element.

Figure 4:
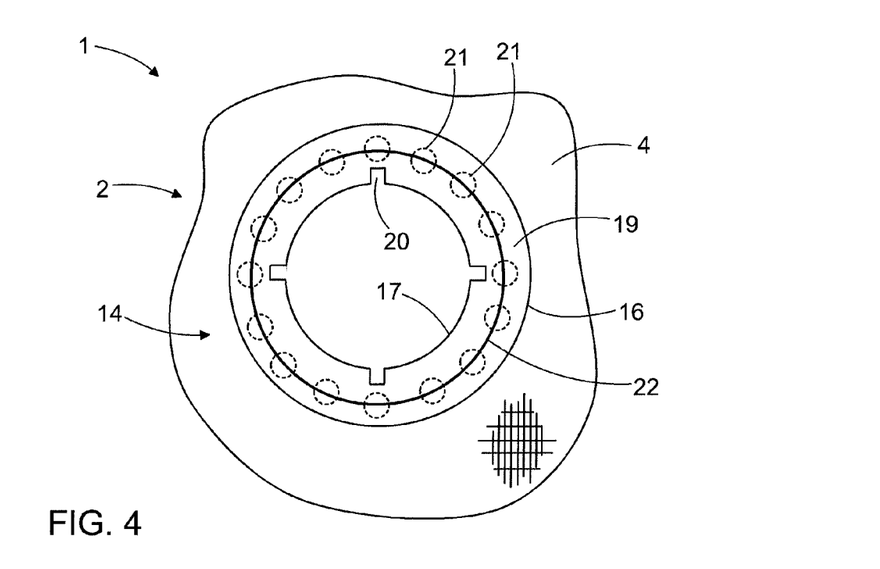
FIG. 4 is a side view illustrating some ways of fastening the support element.

FIG. 4 shows the fastening of the support element 14 by welding to the side surface 4 of the filter element 1. The material of the support element 14 and that of the solid-liquid filter fabric are chosen so that they may be fastened together by welding. Both shall be of a thermoplastic plastic material, preferably polypropylene. The welding may be performed by an ultrasonic or laser welding device. The welding may be carried out as a spot welding 21 or as longer seams 22, for example as one uniform seam.

Figure 5:
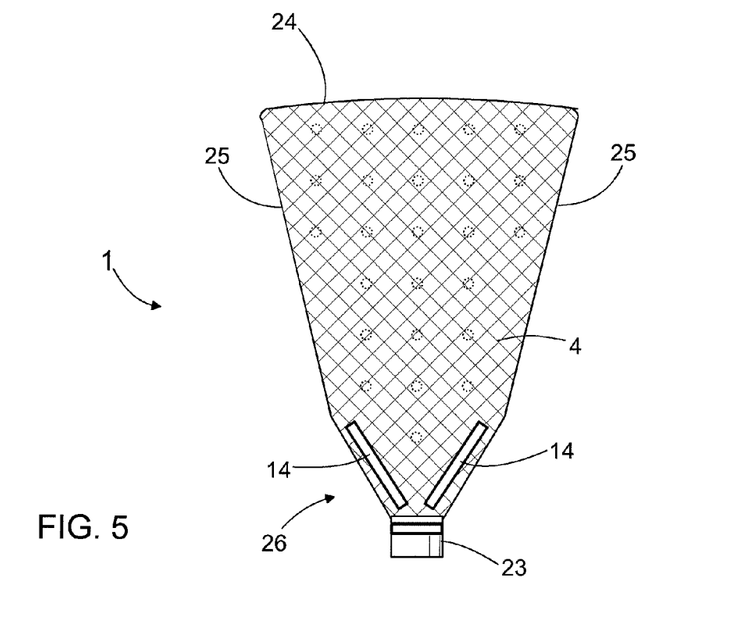
FIG. 5 is a schematic side view of a filter bag provided with a support element.

FIG. 5 shows yet another filter element 1, on whose side surface 4 one or more plate-like support elements 14 may be fastened. In that case the filter element 1 is a filter bag that may be arranged onto a disc filter sector 23. The filter bag has two side surfaces 4 that are joined by an end edge 24 and side edges 25. The filter bag is provided with an opening in a neck part 26 thereof. Support elements 14 may be arranged onto the neck part 26 of the filter bag, for example.

Figure 6:
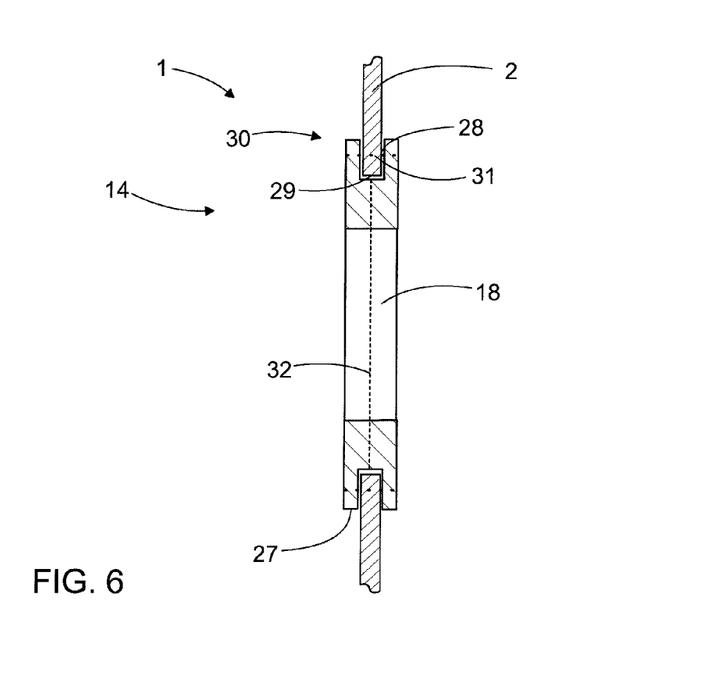
FIG. 6 is a schematic, cross-sectional view of yet another arrangement for fastening a support element to a filter element and its solid-liquid filter fabric.

In FIG. 6 the outer edges 27 of the support element 14 are provided with fastening grooves 28. The solid-liquid filter fabric 2 of the filter element 1 is provided with an opening that has edges 29. The support element 14 is arranged into the opening so that the edges 29 of the opening are in the fastening grooves 28. The support element 14 may be formed of rubber or a flexible plastic material so that it can be mounted in place. Alternatively, the support element 14 may be formed of two halves that hold the edges 29 between them. In that case there may be a form locking 30 between the support element 14 and the solid-liquid filter fabric 2. The form locking 30 may be further secured by an additional fastening 31, which may be a welding seam, for example. Also in this embodiment the support element 14 may be plate-like piece, although it has fastening grooves 29 on the edges and a flow opening 18 in the middle. The support element 14 may be cut from a plate blank and the fastening groove milled to its outer edge 27. Alternatively, the support element 14 may be formed of two halves, the division surface 32 between them being shown in the figure by a broken line.

Figure 7:
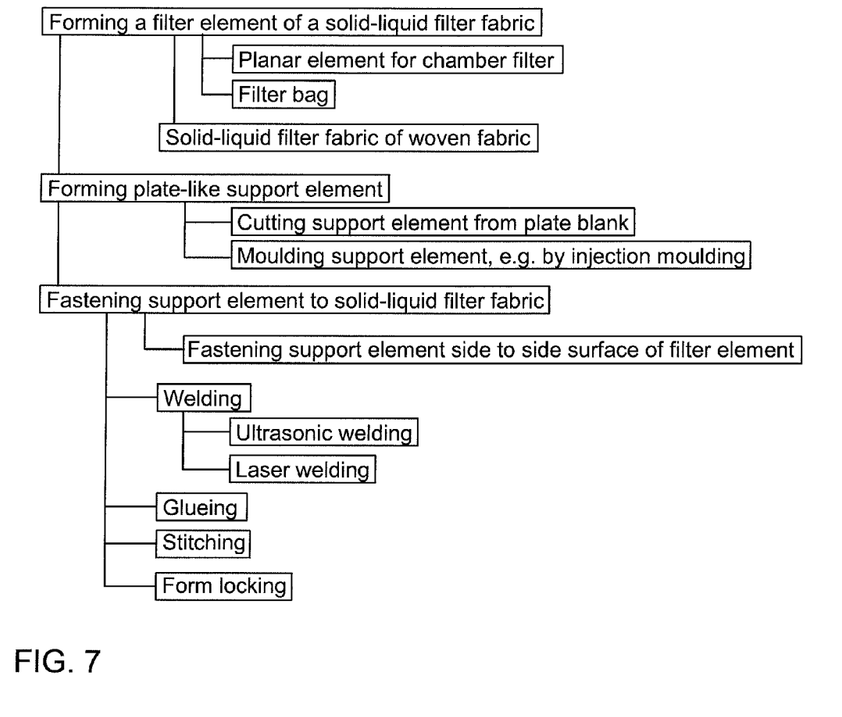
FIG. 7 is a simplified diagram showing the manufacturing of the filter element disclosed in this application.

FIG. 7 is a strongly simplified diagram of features disclosed in this application and relating to the manufacturing of the filter element.

In some cases, features disclosed in this application may be used as such, regardless of other features. On the other hand, when necessary, features disclosed in this application may be combined in order to provide different combinations.

The drawings and the related description are only intended to illustrate the idea of the invention. Details of the invention may vary within the scope of the claims.

The invention claimed is:

1. Filter element for solid-liquid filtering, the filter element comprising:
    at least one filtering portion made of a solid-liquid filter fabric;
    at least one flow opening; and
    at least one support element,
    wherein:
        the support element is a plate-like piece defining a polymer plate structure that differs from a structure of the solid-liquid filter fabric;
        the support element is made of at least one of polypropylene or polyurethane;
        the support element is permanently fastened to the solid-liquid filter fabric of the at least one filtering portion of the filter element via stitches; and
        the support element includes at least one positioning member configured to prevent a separate feed member connected to the filter element from turning relative to the at least one flow opening.

2. The filter element as claimed in claim 1, wherein:
    the filter element comprises side surfaces;
    the support element comprises side surfaces; and
    said side surfaces are arranged against each other and fastened together.

3. The filter element as claimed in claim 1, wherein:
    the support element has the shape of a plate-like annular piece with an inner diameter and an outer diameter; and
    said inner diameter serves as said at least one flow opening.

4. The filter element as claimed in claim 1, wherein the support element has a thickness from 1 to 2 mm.

5. The filter element as claimed in claim 1, wherein the support element is made of the same material as the solid-liquid filter fabric.

6. The filter element as claimed in claim 1, wherein:
    the filter element is a filter element for a vertical chamber filter;
    the filter element is a planar piece with a horizontal top edge and bottom edge, and vertical side edges; and
    the filter element further comprises mounting means for supporting the filter element between filter plates of the vertical chamber filter.

7. Use of the filter element of claim 1 in a vertical chamber filter, said use comprising:
    filtering slurry through the filter element, whereby solid matter particles that do not penetrate the filter element form a solids cake on the surface of the filter element and the filtered liquid is allowed to pass through the filter element; and
    positioning the filter element, during the filtering of the slurry, between filter plates of the vertical chamber filter, thereby restricting a filter chamber of the vertical chamber filter.

8. The filter element of claim 1, wherein the at least one positioning member comprises at least four positioning members located at regular intervals around the at least one flow opening.

9. The filter element of claim 1, wherein the at least one positioning member is at least one of a slot provided on the periphery of the at least one flow opening or an opening formed at a distance from an edge of the at least one flow opening.

10. A method for manufacturing a filter element, the method comprising the steps of:
    forming at least one filtering portion of the filter element of a solid-liquid filter fabric;
    forming a support element separate and distinct from the at least one filtering portion of the filter element, wherein the support element includes at least one positioning member configured to prevent a separate feed member connected to the filter element from turning relative to at least one flow opening of the filter element;
    fastening the support element to the at least one filtering portion of the filter element before the filter element is mounted to a filtering device;

defining a polymer plate structure via the support element, whereby the structure of the support element differs from a structure of the solid-liquid fabric;

using at least one of polypropylene or polyurethane as the material of the support element;

arranging a side surface of the support element against a side surface of the solid-liquid filter fabric; and fastening said side surfaces of the support element and the solid-liquid filter fabric together via stitches.

11. The method of claim 10, wherein the at least one positioning member comprises at least four positioning members located at regular intervals around the at least one flow opening.

12. The method of claim 10, wherein the at least one positioning member is at least one of a slot provided on the periphery of the at least one flow opening or an opening formed at a distance from an edge of the at least one flow opening.

13. An arrangement for solid-liquid filtering, the arrangement comprising:
   a filter element; and
   a feed member connected to the filter element,
   wherein the filter element comprises:
      at least one filtering portion made of a solid-liquid filter fabric;
      at least one flow opening; and
      at least one support element,
   wherein:
      the support element is a plate-like piece defining a polymer plate structure that differs from a structure of the solid-liquid filter fabric;
      the support element is made of at least one of polypropylene or polyurethane;
      the support element is permanently fastened to the solid-liquid filter fabric of the at least one filtering portion of the filter element via stitches; and
      the support element includes at least one positioning member configured to prevent the feed member from turning relative to the at least one flow opening.

14. The arrangement of claim 13, wherein the feed member comprises at least one protrusion configured to engage the at least one positioning member.

15. The arrangement of claim 14, wherein the at least one protrusion is a pin.

16. The arrangement of claim 13, wherein the at least one positioning member comprises at least four positioning members located at regular intervals around the at least one flow opening.

17. The arrangement of claim 13, wherein the at least one positioning member is at least one of a slot provided on the periphery of the at least one flow opening or an opening formed at a distance from an edge of the at least one flow opening.

* * * * *